F. B. HARDSOCG.
TROWEL.
APPLICATION FILED APR. 16, 1913. RENEWED NOV. 30, 1914.

1,125,844.

Patented Jan. 19, 1915.

Witnesses:
Harry S. Gaither
Wm. P. Bond

Inventor,
Fred B. Hardsocg.
by Banning & Banning
Attys.

THE NORRIS PETERS CO., PHOTO-LITHO., WASHINGTON, D. C.

UNITED STATES PATENT OFFICE.

FRED B. HARDSOCG, OF OTTUMWA, IOWA.

TROWEL.

1,125,844. Specification of Letters Patent. Patented Jan. 19, 1915.

Application filed April 16, 1913, Serial No. 761,590. Renewed November 30, 1914. Serial No. 874,905.

*To all whom it may concern:*

Be it known that I, FRED B. HARDSOCG, a citizen of the United States, residing at Ottumwa, in the county of Wapello and State of Iowa, have invented certain new and useful Improvements in Trowels, of which the following is a specification.

The present invention relates to certain improvements in trowels, and more particularly to plasterer's trowels of that general class in which the handle may be removed from the blade. Many mechanics prefer to use an implement of this kind, for the reason that they become accustomed to the use of a particular handle, and when it is necessary to discard the blade portion, or to substitute another blade it is desirable to be able to use the same handle. Different constructions and types of blades are used for different classes of work, but by the provision of a standard construction, including a removable handle, it will be seen that the same handle can be used in connection with any one of the blades, thus obtaining the advantage above mentioned at all times. I am aware of the fact that implements of this class have heretofore been devised in which the handle is removable from the blade, but the present invention is directed to certain improvements, whereby the handle can be very easily connected to or disconnected from the blade, and whereby the handle will always be rigidly connected to the blade notwithstanding the slight wear which will occur by reason of the frequent connecting and disconnecting of the handle to and from the blades. The invention also relates to certain improvements of the above nature in which the blade is provided with a reinforceing rib or the like, which rib may be made to serve as a base or element to which the handle may be connected.

Other objects and uses will appear from a detailed description of the invention which consists in the features of construction and combination of parts hereinafter described and claimed.

Figure 1:
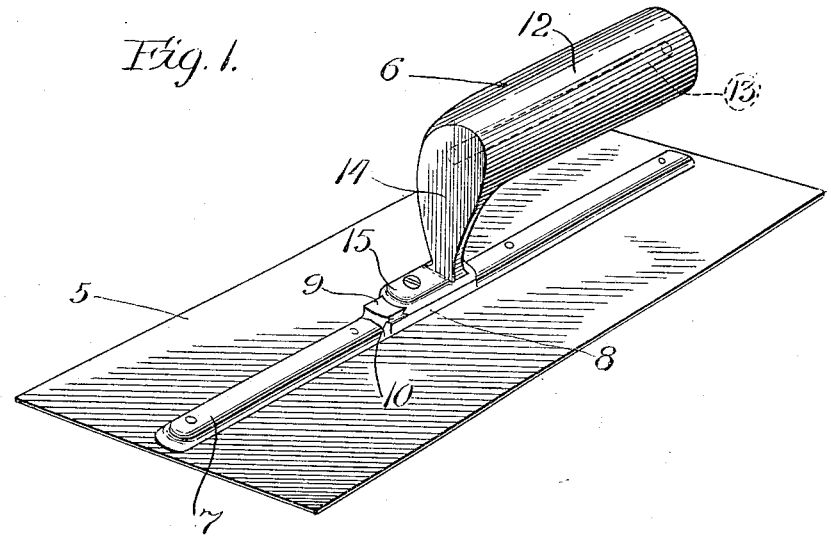
Figure 2:
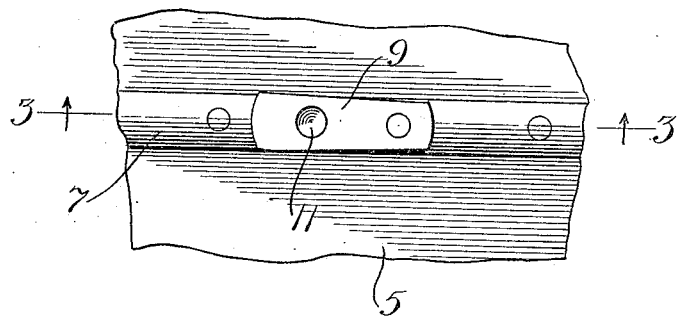
Figure 3:
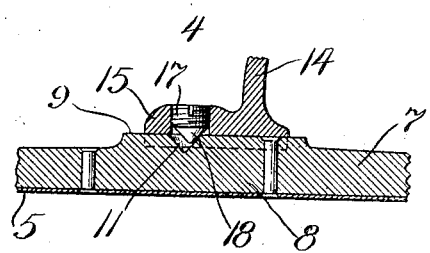
Figure 4:
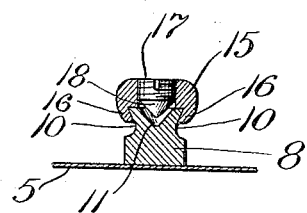

In the drawings: Figure 1 shows a perspective view of the assembled implement; Fig. 2 shows a detail plan view of the central portion of the blade and rib including a tapered dovetail to which the handle is connected; Fig. 3 is a detail longitudinal section taken on the line 3—3 of Fig. 2 looking in the direction of the arrows, the lower portion of the handle being mounted in place; and Fig. 4 is a detail cross section taken on the line 4—4 of Fig. 3 looking in the direction of the arrows.

In the particular arrangement illustrated in the drawings, the blade is designated by the numeral 5 and the handle by the numeral 6; the blade is provided with a longitudinally extending rib or the like 7 which is provided with an enlargement or base portion 8 at a suitable point in its length. This enlargement preferably extends some distance above the remaining portion of the rib, and has its upper surface 9 flattened as best shown in Figs. 2, 3, and 4. That portion of the base 8 which extends above the remainder of the rib is tapered lengthwise as shown in Fig. 2, and has its sides undercut or dovetailed as best shown in Figs. 1 and 4 to provide a pair of recesses or grooves 10. In its central portion it is provided with a recess 11 which is adapted to accommodate a locking screw or nut of the handle.

The handle comprises a wooden cylindrical portion 12 which seats upon and is secured to a pin or the like 13. This pin is preferably made as an extension of a flattened portion 14 which curves downwardly and terminates in a gripping member. This gripping member is in the form of a foot or shoe which is adapted to seat over and lock into engagement with the base portion 8 in the manner illustrated in Figs. 1, 3, and 4. For this purpose the lower side portions of the shoe terminate in or constitute a pair of runners or lips 16 which are undercut and adapted to engage the dovetails of the base 8, and which runners are beveled to engage the side walls of the base. By forming the shoe in this manner, it can be set down into line with the base, and then forced longitudinally or lengthwise until the runners 16 firmly wedge into and lock into engagement with the dovetails, whereupon the handle will be rigidly secured to the blade.

I have provided means for effectively holding the shoe 15 in engagement with the base 8 and for drawing it into firm engagement therewith. In the particular arrangement illustrated this means comprises a set-screw or the like 17 mounted in the shoe and having its lower end terminating in a wedge point 18. This wedge point is adapted to enter and engage the notch 11 of the base 8 so as to hold the handle securely in place with respect to the blade.

In Fig. 3, the parts are shown in the position which they will normally occupy when the shoe 15 is forced into solid engagement with respect to the blade. It will be observed from an examination of this figure that the wedge point 18 of the set-screw has not fully entered the notch 11 of the base, and it will be seen that, by reason of the shape of the notch and the wedge point in order to cause the wedge point to fully enter the notch, it will be necessary for the shoe to advance still further to the left of Fig. 3. Such further advancement would necessitate a still further wedging action between the runners 16 and the dovetails of the base, and would therefore serve to clamp or engage the parts together still more firmly. It will thus be seen that, by forming the notch 11 at a point somewhat in advance of the normal position of the set-screw that whenever the set-screw is tightened down, it will serve also to draw or force the shoe 15 lengthwise of the base, thus insuring that the runners 16 will be firmly forced into engagement with the dovetails by reason of the wedge shape of the base 8. Of course, the pressure created by the set-screw will further increase the wedging action, so that a construction is thus provided which serves very efficiently to wedge and hold the parts together. Nevertheless, the parts can be readily disconnected when it is desired to remove the blade from the handle, it being only necessary to thread the set-screw up two or three turns for this purpose.

Although I have herein shown and described only a single form of construction embodying the features of my invention, still I do not limit myself to the same, except as called for in the claims, but I include within the scope of my invention any equivalent constructions operating in equivalent manners to produce equivalent results.

I claim:

In a device of the class described the combination with a plane blade, of a reinforcing rib secured lengthwise to the central portion thereof, the middle portion of said rib extending a substantial distance above the surface of the blade, and said middle portion having its side faces under-cut and tapering toward each other in one direction to provide a wedge-shaped under-cut tongue, and a handle having a tapered under-cut channel in its lower portion, said channel being tapered and under-cut to match the tongue on the blade, there being a conical recess in the upper face of the tongue, and a set screw in the handle, said set screw having its lower end of conical formation and suitably positioned to engage one of the sides of the recess of the tongue when the parts are wedged together, whereby tightening of the screw tends to wedge the tongue into the channel for the purpose of drawing the parts rigidly together, substantially as described.

FRED B. HARDSOCG.

Witnesses:
W. D. TISDALE,
ARTHUR M. BARTLETT.

Copies of this patent may be obtained for five cents each, by addressing the "Commissioner of Patents, Washington, D. C."